United States Patent [19]  [11]  4,187,684
Smith  [45]  Feb. 12, 1980

[54] THERMALLY RESPONSIVE POWER ELEMENTS WITH MULTIPLE VAPOR/GAS FILLED CAPSULES AND HYDRAULIC FLUID TRANSMISSIONS

[75] Inventor: Charles R. Smith, West Allis, Wis.

[73] Assignee: Eaton Corporation, Cleveland, Ohio

[21] Appl. No.: 697,211

[22] Filed: Jun. 17, 1976

[51] Int. Cl.$^2$ .............................................. F03G 7/06
[52] U.S. Cl. ...................................... 60/531; 417/379; 417/383; 236/98; 337/320; 73/368.4
[58] Field of Search ...................... 60/325, 530, 531; 417/379, 383; 236/98, 99 E, 99 R; 337/117, 306, 307, 320, 326; 200/83 A, 83 B, 83 D, 83 Y; 73/368, 368.1, 368.4

[56] References Cited
U.S. PATENT DOCUMENTS

| 1,656,372 | 1/1928 | Fitts | 239/99 E |
| 1,736,984 | 11/1929 | Sheats | 236/98 |
| 2,316,611 | 4/1943 | Neuse | 73/368.4 |

Primary Examiner—Allen M. Ostrager
Assistant Examiner—Stephen F. Husar
Attorney, Agent, or Firm—Hugh R. Rather; William A. Autio

[57] ABSTRACT

A thermally responsive power device is disclosed employing a thermally sensitive unit in which are housed multiple vapor/gas filled capsules which expand and contract in response to temperature changes. The thermally responsive element is connected in a closed system through a conduit or tube to a remote diaphragm power or motion producing unit, and a temperature stable hydraulic fluid filling the space with the system moves the diaphragm in accordance with the expansions and contractions of the capsules. Several different embodiments for the capsules and their housings are shown, and all embodiments contemplate selective use of capsules with different vapor/gas fills to tailor the completed thermally sensitive elements to provide substantially equal temperature sensitivity in two or more regions of their working temperature range.

3 Claims, 12 Drawing Figures

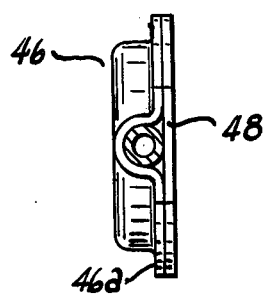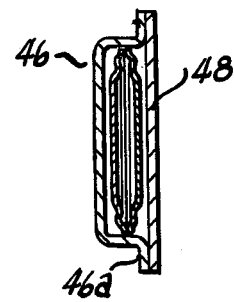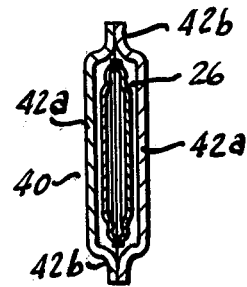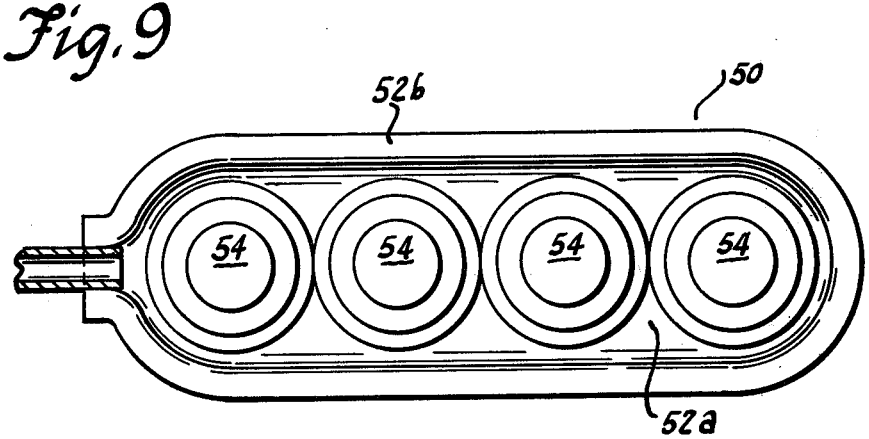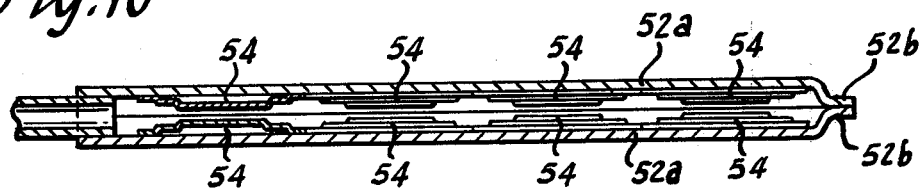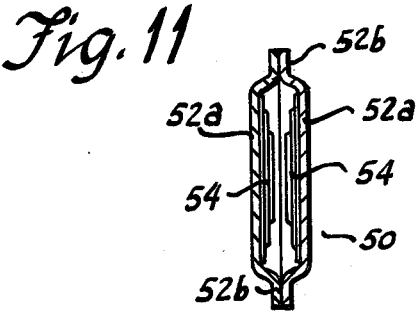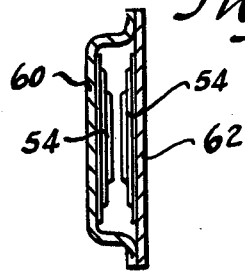

THERMALLY RESPONSIVE POWER ELEMENTS WITH MULTIPLE VAPOR/GAS FILLED CAPSULES AND HYDRAULIC FLUID TRANSMISSIONS

BACKGROUND OF THE INVENTION

Thermally sensitive power elements using capillary tubes and having vapor/gas fills are commonly used to operate electric switches or other control devices in response to upward and downward changes in temperature of a space or area to be controlled. The use of the capillary tubes permits location of the electric switch or other control device at a point which is protected from adverse ambient conditions of temperature, or humidity. However, if the capillary tubes traverse regions where the temperature ranges below the normal temperature ranges encountered in the controlled space or area cross ambient temperature affects can readily produce control point errors.

It is a characteristic of the usual vapor/gas fills used in thermally sensitive power elements of the capillary tube type that the effective working internal pressure developed is dictated by the region or point in the system subjected to the coldest temperature. Thus if the capillary tube in its traverse from the controlled area to the diaphragm motion producing portion is subjected to lower temperature than those encountered in the controlled area, the cut-in and cut-out temperatures at which the associated electric switch or other control device responds may be considerably offset from those desired.

Various expedients to minimize such cross ambient affects have been tried, including use of thermal shields and heaters with the portions of the capillary tube extending between the controlled areas and their associated diaphragm power elements. However, such expedients have not proved to be too satisfactory in minimizing such cross ambient temperature affects, and have added to the cost.

It is also a characteristic of the vapor/gas fills used in such thermally sensitive power elements that they exhibit greater temperature sensitivity at one portion of their working temperature range than others. For use in refrigeration and air conditioning where the differential between desired cut-in and cut-out may be substantial, it is very desirable to have approximately the same temperature sensitivity, but this has been found hard to come by with present day forms of thermally sensitive power elements that use vapor/gas fills. Mixtures of different commercially available refrigerant vapor/gases are usually used to provide a mixture that will provide reasonably satisfactory temperature sensitivity at both ends of the working temperature range. However, that expedient has not proved too satisfactory, as there can be adverse interactions between the gases, particularly over extended periods of time.

OBJECTS OF THE INVENTION

It is the primary object of the invention to provide an improved thermally sensitive power element which permits measurement of temperatures in an area or space to be controlled, and operation of a diaphragm power unit at a point remote and apart from the area or space to be controlled.

Another object of the invention is to provide an element of the aforementioned type which is characterized by its immunity to cross ambient temperature affects that may be encountered outside of the space or area to be controlled.

A further object of the invention is to provide a power element of the aforementioned type which can be readily tailored to provide substantially equal temperature sensitivity responses in two or more portions of its working temperature range.

A still further object of the invention is to provide a thermally sensitive power element of the aforementioned type which lends itself to use of non-metallic materials, in many of its parts, and can be produced by straight forward, well known production methods.

Other objects and advantages of the invention will hereinafter appear.

BRIEF DESCRIPTION OF THE DRAWINGS

FIG. 6 is a transverse sectional view of a portion of the power element of FIGS. 3 to 5.

FIG. 7 is an end view of a modified form of a part of the power element of FIGS. 3 to 6.

FIG. 8 is a transverse sectional view of the part of the power element shown in FIG. 7.

FIG. 9 is a plan view in longitudinal section of a portion of a third form of thermal power element constructed in accordance with the invention.

FIG. 10 is a longitudinal sectional view in elevation of the power element of FIG. 9.

FIG. 11 is a transverse sectional view of the power element of FIGS. 9 and 10, and FIG. 12 is a view like FIG. 11 but showing a modified form for a portion of the power element of FIGS. 9 to 11.

DESCRIPTION OF THE PREFERRED EMBODIMENTS

Figure 1:
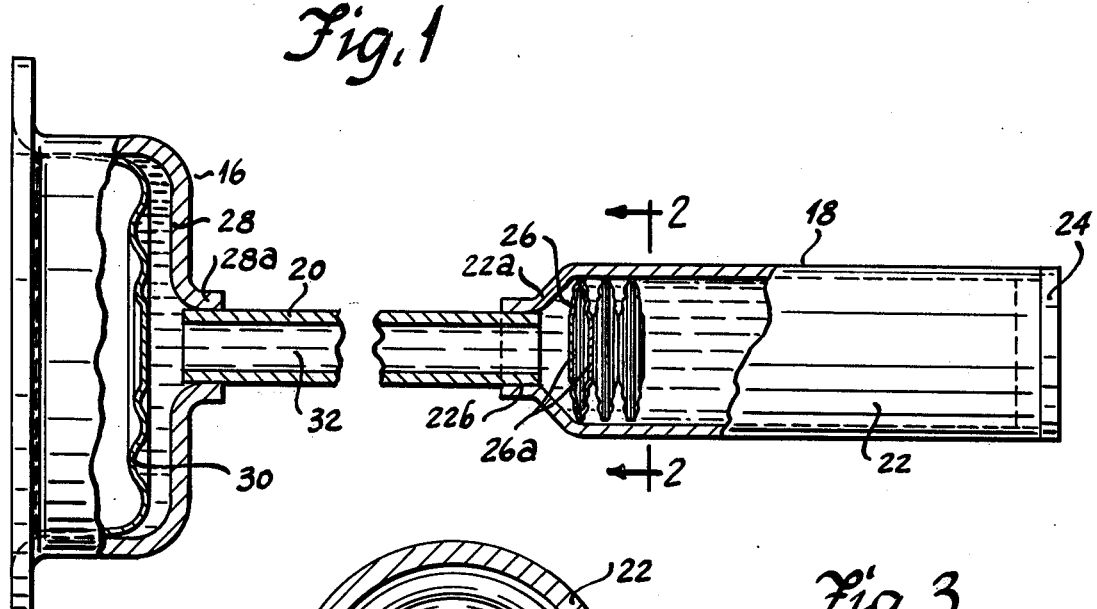
FIG. 1 is a view partially in longitudinal section of a thermal power element constructed in accordance with the invention.
Figure 2:
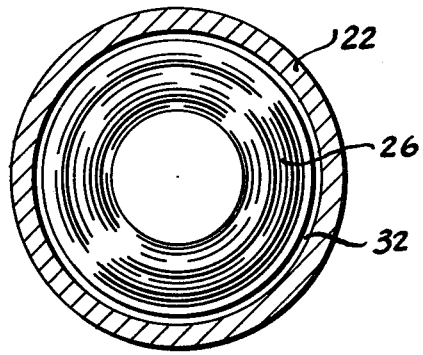
FIG. 2 is a view in transverse cross section taken along the line 2—2 of FIG. 1.
Figure 3:
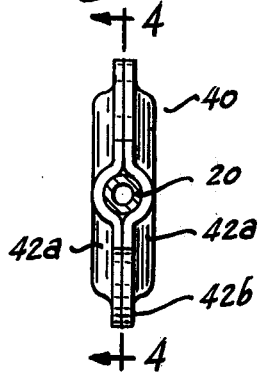
FIG. 3 is an end view of a second form of thermal power element incorporating the invention.

In FIGS. 1 and 2 there is shown a thermally responsive power device which comprises a diaphragm motion producing unit 16, a thermally responsive unit 18, and an interconnecting fluid transmitting tube or conduit 20. Unit 18 has a generally cylindrical housing 22 which can be made from metal, such as brass or steel, or it can be made from a suitable rigid plastic material. Housing 22 has a separate end closing plug 24 which is preferably made of the same material as the housing.

Within the housing 22 there are placed a multiplicity of thermally responsive capsules 26 of like diameter which are stacked as shown in FIGS. 1 and 2, and occupy a substantial portion of the space within the housing. Each of the capsules preferably comprises a pair of mirror image, circular discs 26a with convolutions in their surfaces. Such discs are preferably formed of a gas impervious metal such as stainless steel or beryllium copper. These opposed mating discs are welded around their peripheral margins to effect substantially complete closure therebetween except for a small opening. Then their interiors are evacuated by suitable vacuum apparatus, and a partial fill of a desired thermally sensitive vapor/gas is introduced into their interiors. Upon completion of such filling operation, the remaining small opening between the discs 26a is welded closed to provide a hermetic seal around the peripheral margins between the discs.

It will be understood that the partial fill of vapor/gas used in the capsules 26 can be tailored to provide useful expansion and contraction of the discs 26a for the temperature range for which the device will be designed. Of course, the discs 26a on increase in temperature will move outwardly within the housing 22 to cause the capsules 26 to fill more of the interior housing space. Conversely, on decrease in temperature to which unit 18 is subjected the discs 26a of each capsule will contract toward each other, and the capsules 26 then take up less of the total space within the housing.

The housing 22 at the end opposite plug 24 has a frusto-conical neck portion 22a which has an aperture 22b. The tube 20 adjacent its right hand end is secured in liquid sealing relation to the inner surface of housing 22 within the aperture 22b. Tube 20 adjacent its other end extends into the flanged aperture 28a of a cup shaped member 28, and is provided with a suitable liquid seal with the flange about the aperture. A diaphram 30 has its peripheral margin joined to the inner surface of member 28 in a liquid sealed relation.

The tube 20 can be made of suitable plastic materials or metal as desired. The means and method of effecting the aforementioned seals behind tube 20 and housing 22 and member 28 will of course depend upon the materials these parts are made from. If all are metal welding methods preferably are used. If all are made from plastics ultrasonic plastic welding methods might be used in some instances, while chemical adhesive sealing methods can also be used.

It is also contemplated that some of these parts could be metal and others made from plastic. There are commercially available sealants and adhesives which permit the joining of plastic to metal parts and provide strong assembly retaining joints that also provide liquid seals. For example the thermal power element 18 which would be mounted in the region whose temperature is to be controlled might preferably be made all of metal, while the tube 20, and the unit 16, inclusive of the member 28 and diaphragm 30 could be made of plastics or certain types of rubber.

As shown in FIG. 1 diaphragm 30 is assumed to be of a semi-rigid, convoluted form, which in one preferred form can be made of a metal such as beryllium copper that will be self restoring to normal position within limits. However, such diaphragm, if its movement is opposed by resilient force means such as a loading spring (not shown), could be made of a flexible material such as neoprene. The present invention contemplates that diaphragm 30 can be formed of either metal, rubber, or plastic materials, and can be semi-rigid or flexible as the particular end use requires.

In the course of construction after the units 16, 18 and 20 are jointed together in fluid sealed relation as hereinbefore described, the capsules 26 are placed inside housing 20, and a suitable hydraulic liquid 32 is introduced through the open end of housing 22 to completely fill the spaces within the diaphragm chamber in unit 16, tube 20, and the interior of housing 22. Plug 24 is then inserted and sealed to the housing 22 to complete the assembly. The hydraulic liquid 32 is preferably selected from commercially available grades that are relatively stable with respect changes in specific volume for the temperature range to which the completed device will normally be subjected.

Assume that the thermally responsive unit 18 of the device is mounted in a region whose temperature is to be measured and/or controlled. With an increase in temperature, the capsules 26 will expand and take up more of the interior space within the housing 22. Consequently some of the liquid 32 will be forced out of the housing 22, through tube 20 into the diaphragm chamber and cause diaphragm 30 to move leftwardly as viewed in FIG. 1. Conversely on unit 18 being subjected to a decrease in temperature, the capsules 26 contract, and if diaphragm 30 is self restoring or subjected to an opposing loading spring or mechanical switch mechanism force, liquid 32 will move out of diaphragm chamber, through tube 20 into the interior of housing 22 to fill the additional space occurring because of the contractions of the capsules 26.

It is an inherent characteristic of thermal sensitive vapor or gases heretofore used in thermally responsive power devices that they are more sensitive, and thus produce a greater change in pressure per degree change in temperature in one portion of their working temperature range than other portions. For many uses, particularly in refrigerator or air conditioner controls having a fairly wide differential between desired cut-in and cut-out temperatures, it would be desirable to have substantially equal sensitivity responses in the regions of cut-in and cut-out. Use of the thermally responsive device hereinbefore described makes possible tailoring in its construction to afford such regions of substantially equal sensitive response.

The last mentioned tailoring for equal temperature sensitivity response can be readily obtained by filling certain of the capsules 26 used in the unit 18 with a thermal vapor/gas that has its greatest temperature response sensitivity in a region centered on a given high temperature, and filling the remainder of the capsules in unit 18 with a thermal vapor or gas that has its greatest sensitivity centered around a lower temperature. There can be an equal, or unequal, number of such capsules with the two different fills, and their arrangement within the housing 22 is not critical. They could be regularly interspersed in an alternating manner, all of one kind stacked together, or randomly intermixed as desired.

Such tailoring is not limited to two temperature regions, and even three or more different vapor or gas fills could be used in the capsules 26. Moreover, greater sensitivity centered around any desired temperature can be enhanced by using more capsules 26 filled with a vapor/gas fill that exhibits its greatest sensitivity in a region of that temperature than other such capsules with other vapor/gas fills.

Thermally responsive power elements using capillary systems filled with refrigerant vapor/gases which change phase at normal refrigeration or room temperature are susceptible to undesirable cross ambient temperature affects. Typically, if their capillary tubes extend through regions where they are subjected to temperatures considerably different from the portion which is in the desired region to be controlled. It is characteristic in such cases that the region of the capillary subjected to the lowest temperature will dictate the temperature response of the device which may or may not be that in the region to be controlled. Various expedients heretofore used in an attempt to minimize such cross ambient affects have only been partially successful and have increased costs of manufacture.

The thermally responsive device hereinbefore described, by its construction renders it substantially immune to such cross ambient temperature affects. As the tube 20 and the test of the system is filled with hydraulic liquid 32 that has little or no specific volume change over the desired working temperature range, any temperature to which tube 20 or unit 16 is subjected will have no affect on the change in position of diaghragm 30.

Even if there is a slight change in volume in tube 20 or in the diaphragm in unit 18 due to temperature, this results in a slight decrease or increase in pressure exerted on the exterior of the capsules 26. A corresponding decrease in pressure occurs integrally of the capsules to change more of the fill from the vapor to the gaseous state, or vice versa, to match the temperature pressure relationship to which the capsules are subjected. Thus the device is self correcting for any changes in volume that could occur in the unit at any point because of cross ambient temperature affects.

While the embodiment of FIGS. 1 and 2 is entirely practical and useful, their are other embodiments which have advantages in respect of reduced manufacturing costs. A modified form of thermally responsive unit, such as the unit 40, shown in FIGS. 3 to 6 has advantages in ease and cost of manufacture. More particularly unit 40 has a housing 42 comprising identical mirror image halves 42a that are secured together in a liquid seal relation along the outer edges of their flanged portions 42b.

Figure 4:
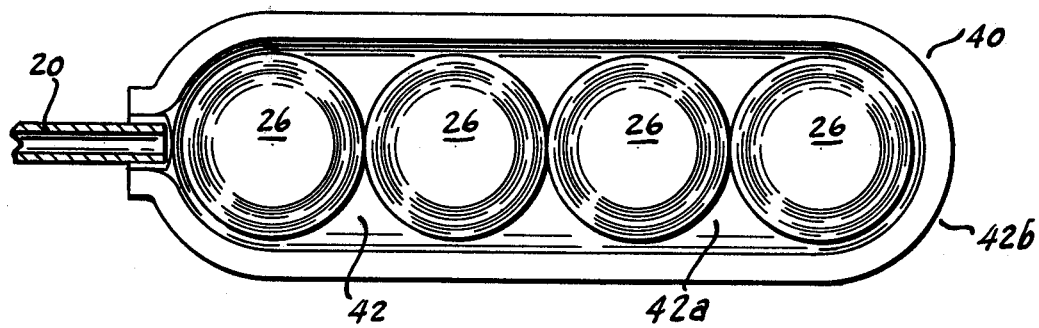
FIG. 4 is a plan view in longitudinal section taken along the line 4—4 of FIG. 3.

At one end the flanges 42b are formed to provide an aperture in which the tube 20 extends and its sealed in a liquid sealing arrangement. The capsules 26 lie in a side-by-side arrangement as best shown in FIG. 4 in the interior cavity of housing 42, and its remaining space is filled with the hydraulic liquid 32 in the same manner described in connection with the embodiment of FIGS. 1 and 2. The housing parts 42a can be made of plastic or metal as desired.

Figure 5:
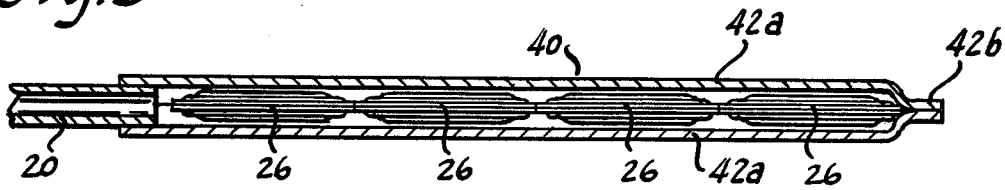
FIG. 5 is a longitudinal sectional view in elevation of the form shown in FIG. 4.

FIGS. 7 and 8 show a modification that can be made in the embodiment of FIGS. 4 to 6. Instead of making the housing of identical mirror image parts, the modified construction uses a part 46 providing a channel shaped recess, and a flat cover 48 secured to the flanges 46a to provide a sealed enclosure.

FIGS. 9 to 11 show a third modification of the thermally responsive unit. In this embodiment a housing 50 is provided which has mirror image parts 52a which are joined together in opposed relation in a liquid sealed relation along the edges of their flanges 52b. In this embodiment the parts 52a are preferably formed of stainless steel. On the inside wall of each part 52a convoluted discs 54 formed of a beryllium copper are hermetically sealed as by welding. Each disc 54 forms with the parts 52a a cavity in which there is a partial fill of a vapor or gas like that of the capsules 26 of the embodiment of FIGS. 1 and 2.

FIG. 12 shows a modification of the device of FIGS. 10 and 11, in which the enclosure for the thermally responsive unit comprises a part 60 like the part 46 in FIGS. 7 and 8, and a part 62 like the part 48 of the latter Figures. The discs 54 are attached to the inner walls of the parts 60 and 62 in the same manner as aforedescribed in connection with the embodiments of FIGS. 9 to 11.

I claim:

1. A thermally responsive unit for connection to a motion producing output unit in a closed system using fluid for power transmission in response to temperature changes, in combination, two housing members at least one of which is of shallow channel shape and has out-turned flanges which are sealed along its edges to the edges of the other member, a multiplicity of circular convoluted discs hermetically sealed to the inner surfaces of said housing members with air being evacuated from the spaces between each of said discs and the member to which they are sealed and individual partial fills of a thermally sensitive vapor/gas being provided in place thereof in said spaces.

2. A thermally responsive unit in accordance with claim 1 wherein both of said housing members are of shallow shape and are sealed along the edges of their out-turned flanges and wherein said discs are hermetically sealed to the inner surfaces of the bight portions of said members.

3. A thermally responsive unit in accordance with claim 1 wherein one of said housing members is a flat plate sealed along its edges to the edges of the out-turned flanges of the other shallow channel shaped member.

* * * * *